US009588556B2

(12) United States Patent
Habermehl

(10) Patent No.: US 9,588,556 B2
(45) Date of Patent: Mar. 7, 2017

(54) TEMPERATURE CONTROL SYSTEM FOR TRANSMITTER CHIP

(71) Applicant: Neil Keith Habermehl, Irvine, CA (US)

(72) Inventor: Neil Keith Habermehl, Irvine, CA (US)

(73) Assignees: Electro-Motive Diesel, Inc., Lagrange, IL (US); Secure Communications Systems Inc., Santa Ana, CA (US)

( * ) Notice: Subject to any disclaimer, the term of this patent is extended or adjusted under 35 U.S.C. 154(b) by 383 days.

(21) Appl. No.: 14/246,761

(22) Filed: Apr. 7, 2014

(65) Prior Publication Data

US 2015/0286258 A1    Oct. 8, 2015

(51) Int. Cl.
  *G05D 23/00* (2006.01)
  *G06F 1/20* (2006.01)
  *G05B 19/404* (2006.01)

(52) U.S. Cl.
  CPC .......... *G06F 1/206* (2013.01); *G05B 19/404* (2013.01); *G05B 2219/49206* (2013.01)

(58) Field of Classification Search
  CPC ..................................................... G06F 1/206
  USPC ........................................ 700/1–89, 299–306
  See application file for complete search history.

(56) References Cited

U.S. PATENT DOCUMENTS

| 5,731,952 | A * | 3/1998 | Ohgami | G06F 1/1616 |
| | | | | 361/679.47 |
| 7,513,438 | B2 * | 4/2009 | Mueller | F24F 5/0096 |
| | | | | 165/209 |
| 8,493,703 | B2 * | 7/2013 | Kirschbaum | G06F 1/206 |
| | | | | 361/103 |
| 2002/0050833 | A1 * | 5/2002 | Jones | G01R 31/2874 |
| | | | | 324/750.09 |
| 2002/0121349 | A1 * | 9/2002 | Warren | D21C 3/228 |
| | | | | 162/49 |

(Continued)

FOREIGN PATENT DOCUMENTS

| WO | WO 2008/118681 | 10/2008 |
| WO | WO 2012/108781 | 8/2012 |
| WO | WO 2012/138248 | 10/2012 |

OTHER PUBLICATIONS

Noordin, Kamarul Ariffin, Chow Chee Onn, and Mohamad Faizal Ismail. "A low-cost microcontroller-based weather monitoring system." CMU journal 5.1 (2006): pp. 33-39.*

(Continued)

*Primary Examiner* — Satish Rampuria
(74) *Attorney, Agent, or Firm* — Finnegan, Henderson, Farabow, Garrett & Dunner, LLP

(57) ABSTRACT

A temperature control system for a transmitter chip in a consist is disclosed. The temperature control system may include a heater configured to provide heat to the transmitter chip, and a sensor configured to detect a consist condition and generate a signal indicative of the detected consist condition. The temperature control system may also include a controller in communication with the heater and the sensor. The controller may be configured to receive the signal indicative of the detected consist condition, compare the detected consist condition with a predetermined consist condition, and selectively control the heater to provide heat to the transmitter chip based on the comparison.

13 Claims, 3 Drawing Sheets

(56) References Cited

U.S. PATENT DOCUMENTS

| | | | |
|---|---|---|---|
| 2007/0132555 A1* | 6/2007 | August | G06K 19/07749 340/10.1 |
| 2007/0179677 A1* | 8/2007 | Mishra | B01L 7/00 700/300 |
| 2010/0235004 A1* | 9/2010 | Thind | G05B 15/02 700/277 |
| 2011/0077758 A1* | 3/2011 | Tran | A61B 5/002 700/94 |
| 2013/0342362 A1 | 12/2013 | Martin | |
| 2014/0129039 A1* | 5/2014 | Olive-Chahinian | A01G 25/16 700/284 |

OTHER PUBLICATIONS

Hussain, Tarik, Tarek Saadawi, and Samir Ahmed. "Overhead infrared vehicle sensor for traffic control." Vehicular Technology Conference, 1993., 43rd IEEE. IEEE, 1993. pp. 351-355.*

Sankar, P., and Suresh R. Norman. "Embedded system for monitoring atmospheric weather conditions using weather balloon." Control, Automation, Communication and Energy Conservation, 2009. INCACEC 2009. 2009 International Conference on. IEEE, 2009. pp. 1-4.*

* cited by examiner

TEMPERATURE CONTROL SYSTEM FOR TRANSMITTER CHIP

TECHNICAL FIELD

The present disclosure is directed to a temperature control system, and more particularly, to a temperature control system for a transmitter chip.

BACKGROUND

Communication systems for maintaining operations of a mobile machine often use hard-wined or wireless networks to transmit data to components of the machine and/or other systems associated with the machine. One example of a communication system in a mobile application involves communications between locomotives in a consist. In this application, the communication is typically facilitated through the use of an MU (Multi-Unit) cable that extends along the length of the consist. The MU cable is comprised of many different wires, each capable of carrying a discrete signal used to regulate a different aspect of consist operation.

These communications systems include one or more transmitter chips that control the transmission of network data. Recently, transmitter chips with higher bandwidth capabilities have been developed to increase data throughput. For example, the higher bandwidth transmitter chips may allow higher frequency ranges, compared to conventional transmitter chips. In addition, the higher bandwidth transmitter chips may be capable of communicating through more wires of an MU cable than conventional transmitter chips. As a result, the higher bandwidth transmitter chips may increase performance of communication systems by increasing both the quantity and speed of data throughput.

One of the problems that arises when using higher bandwidth transmitter chips is that, in some applications, the mobile machines are frequently required to operate in extreme environmental conditions, such as extreme temperatures. Higher bandwidth transmitter chips may be de-rated when temperatures fluctuate to extreme levels, such as very cold conditions (e.g., below −30° Celsius). Thus, many communication systems that are required to operate in very cold conditions often use conventional, lower bandwidth transmitter chips, which are equipped to operate in the colder conditions. However, these conventional, lower bandwidth transmitter chips may not perform as well as the higher bandwidth transmitter chips. Therefore, it is desirable to provide a system allowing the use of higher bandwidth transmitter chips when operating in very cold conditions.

The disclosed system is directed to overcoming one or more of the problems set forth above and/or other problems of the prior art.

SUMMARY

In one aspect, the present disclosure is directed to a temperature control system for a transmitter chip in a consist. The temperature control system may include a heater configured to provide heat to the transmitter chip, and a sensor configured to detect a consist condition and generate a signal indicative of the detected consist condition. The temperature control system may also include a controller in communication with the heater and the sensor. The controller may be configured to receive the signal indicative of the detected consist condition, compare the detected consist condition with a predetermined consist condition, and selectively control the heater to provide heat to the transmitter chip based on the comparison.

In another aspect, the present disclosure is directed to a method of controlling temperature of a transmitter chip in a consist. The method may include detecting a consist condition, and comparing the detected consist condition with a predetermined consist condition. The method may also include selectively heating the transmitter chip based on the comparison.

DETAILED DESCRIPTION

Figure 1:
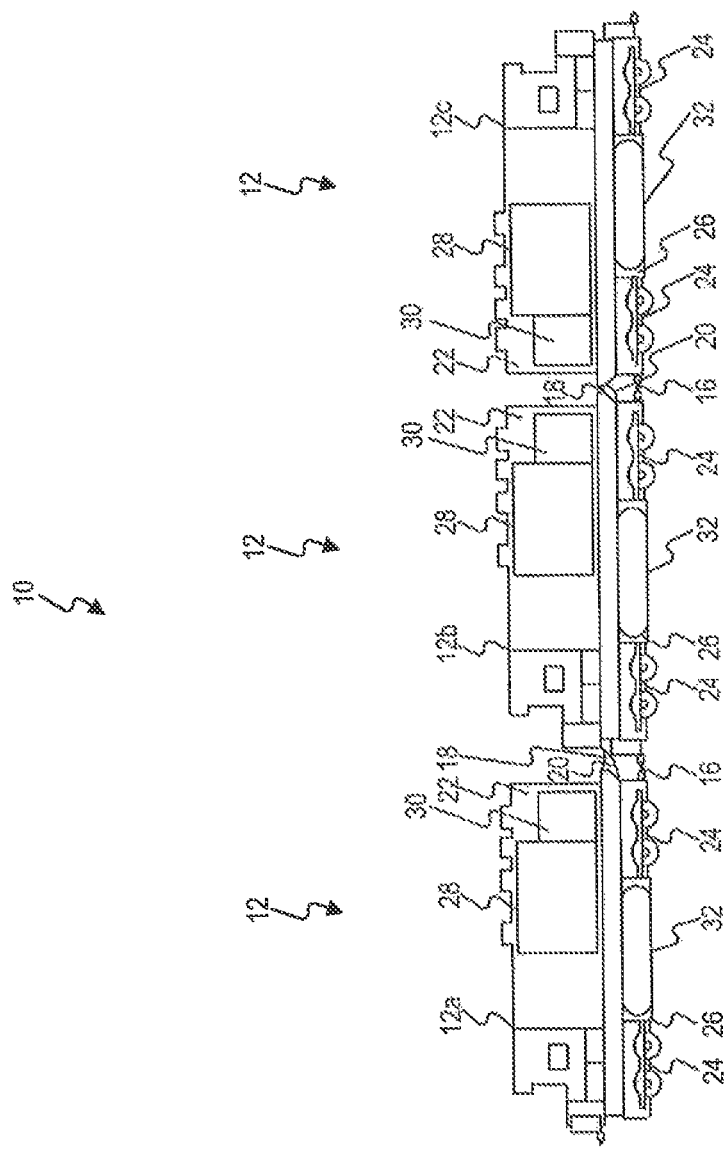
FIG. 1 is a pictorial illustration of exemplary disclosed consist.

FIG. 1 illustrates an exemplary mobile machine application. For example, as shown in FIG. 1, a train consist 10 may include one or more locomotives 12. In the disclosed embodiment, consist 10 has three different locomotives 12, including a lead locomotive 12a and two trailing locomotives 12b, 12c. It is contemplated, however, that consist 10 may include any number of locomotives 12 and other cars (e.g. tender cars), and that locomotives 12 may be located in any arrangement and in any orientation (e.g., forward-facing, or rears facing). Consist 10 may be located at the front of a train of other rail vehicles (not shown), within the train of rail vehicles, or at the end of the train of rail vehicles. It is also contemplated that more than one consist 10 may be included within a single train of rail vehicles, if desired, and/or that consist 10 may travel at times without a train of other rail vehicles.

Each locomotive 12 may be connected to an adjacent locomotive 12 in several different ways. For example, locomotives 12 may be connected to each other via a mechanical coupling 16, one or more fluid couplings 18, and one or more electrical couplings 20. Mechanical coupling 16 may be configured to transmit tractive and braking forces between locomotives 12. Fluid couplings 18 may be configured to transmit fluids (e.g., fuel, coolant, lubrication, pressurized air, etc.) between locomotives 12. Electrical couplings 20 may be configured to transmit power and/or data (e.g., data in the form of electrical signals) between locomotives 12, in one example, electrical couplings 20 include an intra-consist electrical cable, such as a MU cable, configured to transmit conventional command signals and/or electrical power. In another example, electrical couplings 20 include a dedicated data link configured to transmit packets of data (e.g., Ethernet data). In yet another example, the data packets may be transmitted via the intra-consist electrical cable. It is also contemplated that some data may be transmitted between locomotives 12 via a combination of the intra-consist electrical cable, the dedicated data link, and/or other means (e.g., wirelessly), if desired.

Each locomotive 12 may include a car body 22 supported at opposing ends by a plurality of trucks 24 (e.g., two trucks 24). Each truck 24 may be configured to engage a track (not shown) via a plurality of wheels, and to support a frame 26 of car body 22. Any number of engines 28 may be mounted to frame 26 within car body 22 and drivingly connected to a generator 30 to produce electricity that propels the wheels of each truck 24. Engines 28 may be internal combustion engines configured to combust a mixture of air and fuel. The fuel may include a liquid fuel (e.g., diesel) provided to engines 28 from a tank 32 located onboard each locomotive 12 or via fluid couplings 18, and/or a blended mixture of the liquid and gaseous fuels.

Figure 2:
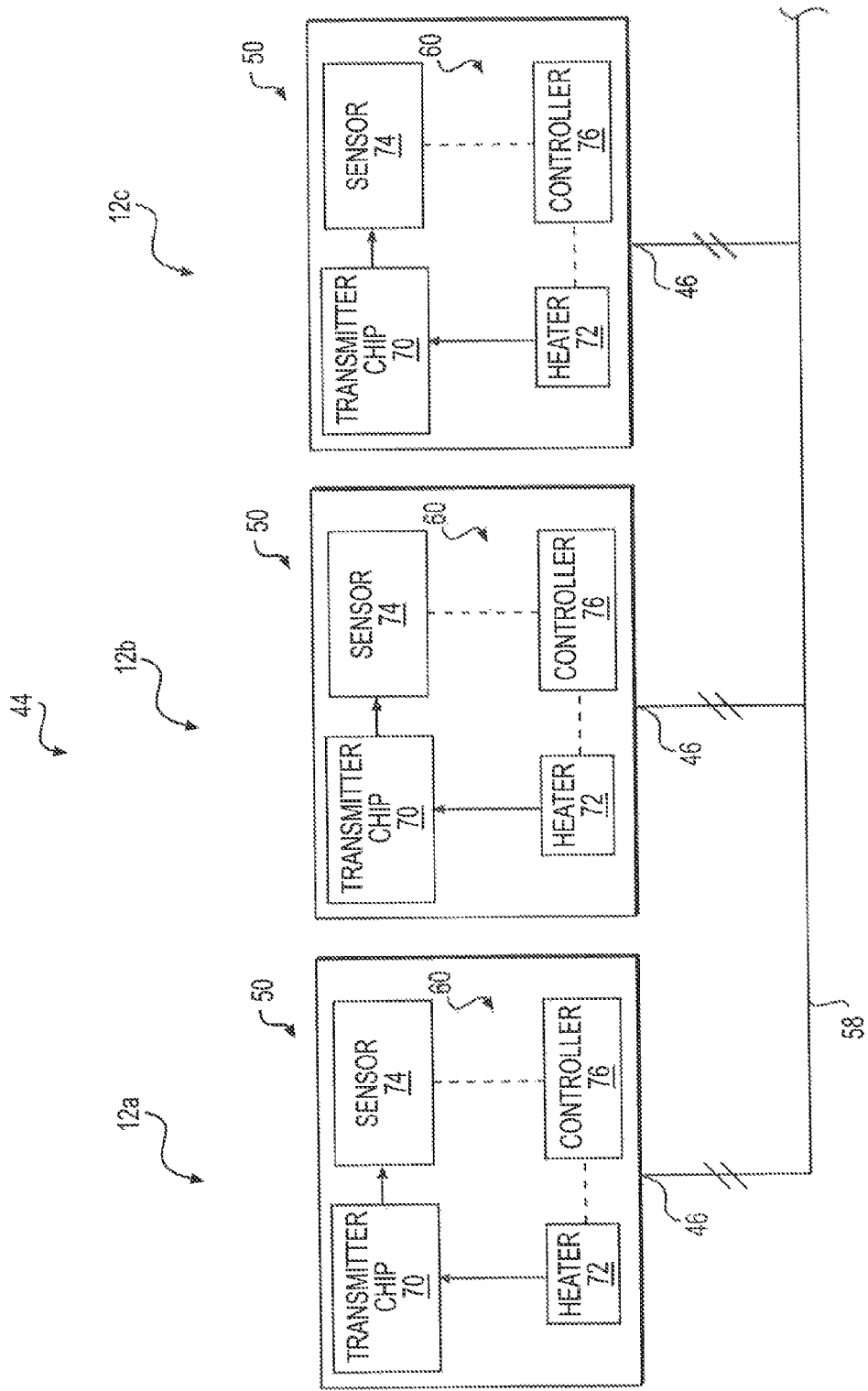
FIG. 2 is a diagrammatic illustration of an exemplary disclosed transmitter chip and temperature control system that may be used in conjunction with the consist of FIG. 1.

As shown in FIG. 2, consist 10 may be equipped with a communication system 44 that facilitates coordinated control of locomotives 12. Communication system 44 may include, among other things, an access point 46 for each locomotive 12. Each access point 46 may be connected to one or more wired and/or wireless networks, and used to communicate command signals and/or data between controllers of each rail vehicle and various other network components (e.g., sensors, valves, pumps, heat exchangers, accumulators, regulators, actuators, UPS components, etc.) that are used to control locomotives 12. In one example, access points 46 may be connected to each other via an intra-consist electrical cable 58.

Each access point 46 may include one or more conventional computing components known in the art (not shown) such as a processor, input/output (I/O) ports, a storage, a memory. In some embodiments, the I/O ports may facilitate communication between the associated access point 46 and one or more network components. The processor may include one or more processing devices, such as microprocessors and/or embedded controllers. The storage may include volatile or non-volatile, magnetic, semiconductor, tape, optical, removable, non-removable, or other type of computer-readable medium or computer-readable storage device. The storage may be configured to store programs and/or other information that may be used to implement one or more of the processes discussed below. The memory may include one or more storage devices configured to store information.

According to some embodiments, each access point 46 may also include one or more transmitter chips 70. Each transmitter chip 70 may embody, for example, a microprocessor chip configured to perform network communications over intra-consist electrical cable 58. Transmitter chip 70 may also receive incoming signals containing network data for processing, and transmit outgoing signals with network data to be processed by other transmitter chips 70 associated with other locomotives 12. It is contemplated that, although only one transmitter chip 70 associated with each locomotive 12 is shown in FIG. 2, any number of transmitter chips 70 may be used to perform network communications.

In the disclosed embodiment, transmitter chip 70 may allow higher bandwidth communication (i.e., higher frequency ranges) over the intra-consist electrical cable 58 than conventional transmitter chips. For example, transmitter chip 70 may allow frequency ranges of between about 2 and 68 MHz. In addition, transmitter chip 70 may also increase the number of wires of intra-consist electrical cable 58 that may be utilized at any given time. For example, transmitter chip 70 may allow network data to be transmitted over 4 wires at a time instead of 2 wires, thereby increasing the amount of data that can be transmitted from one access point 46 to another over a period of time. By using transmitter chip 70, performance of consist communication system 44 may be increased.

In some applications, however, when consist 10 is operating in extremely cold conditions, transmitter chip 70 may experience decreased performance and/or failure. For example, when operating at extremely cold temperatures, data throughput of transmitter chip 70 may be substantially decreased because one or more components of transmitters chip 70 may freeze, causing short circuits and/or connection problems. In the disclosed embodiment, these problems may be overcome by selectively heating transmitter chip 70 with a temperature control system 60.

As shown in FIG. 2, temperature control system 60 may include, for example, a heater 72, a sensor 74, and a controller 76. Heater 72 and sensor 74 may be operably connected to transmitter chip 70 and/or in communication with controller 76. In one embodiment, transmitter chip 70, heater 72, sensor 74, and controller 76 may all be housed within a compartment 50 associated with transmitter chip 70. It is contemplated, however, that in other embodiments, one or more components of temperature control system 60 may be located outside of compartment 50, as desired.

In some embodiments, heater 72 may be positioned proximate to transmitter chip 70 or in direct contact with transmitter chip 70 to provide sufficient heat to transmitter chip 70. Heater 72 may embody any type of heater known in the art. For example, heater 72 may be electric and powered by a battery or any existing components associated with consist 10 (e.g., an energy storage device located on consist 10). Heater 72 may be configured to receive incoming signals from controller 76, and emit heat to increase a temperature of transmitter chip 70 based on the incoming signals.

Sensor 74 may be located anywhere near or within compartment 50 and be configured to generate signals indicative of one or more consist conditions. In one example, sensor 74 may detect at least one of an ambient temperature, a location of consist 10, and a current time of year, and generate a signal indicative thereof. In another example, sensor 74 may detect a temperature of transmitter chip 70. In yet another example, sensor 74 may detect a degradation of transmission of data throughput between access points 46 of locomotives 12. Sensor 74 may include any number of sensors known in the art that are capable of performing the above operations. For example, sensor(s) 74 may include a temperature sensor, a position sensor, a clock, and/or a data sensor. The signals generated by sensor(s) 74 may be directed to controller 76 for further processing.

Controller 76 may embody a single microprocessor or multiple microprocessors that is configured to selectively heat transmitter chip 70 based on information obtained from sensor(s) 74. More specifically, based on one or more consist conditions, controller 76 may selectively actuate heater 72 to provide heat to transmitter chip 70, thereby increasing a temperature of transmitter chip 70. Numerous commercially available microprocessors may be configured to perform the functions of controller 76. Controller 76 may include a memory, a secondary storage device, a processor, and any other components for running an application. Various other circuits may be associated with controller 76 such as power supply circuitry, signal conditioning circuitry, solenoid driver circuitry, and other types of circuitry. It is contemplated that, in some embodiments, controller 76 may be a master controller associated with locomotive 12 and be configured to control other operational aspects of its related rail vehicle.

According to some embodiments, controller 76 may be configured to receive the signal from sensor 74, and compare the corresponding detected consist condition with a predetermined consist condition. Based on the comparison, controller 76 may cause heater 72 to turn on or off. Controller 76 may then continue to detect the consist condition, and control heater 72 based on the comparison of the detected consist condition and the predetermined consist condition. In some embodiments, controller 76 may also be configured to selectively adjust a heat setting of heater 72 based on the comparison of the detected consist condition and the predetermined consist condition.

It is contemplated that, in some embodiments, temperature control system 60 may be active in all operational states of consist 10, including normal operation, standby operation, and shutdown operation modes. This configuration may ensure that transmitter chip 70 maintains a suitable temperature, especially when consist 10 is shutdown in a very cold operating environment. Further operations of temperature control system 60 are described in greater detail below with respect to FIG. 3.

INDUSTRIAL APPLICABILITY

The disclosed temperature control system may be applicable to any transmitter chip. The disclosed temperature control system may allow higher bandwidth communication to be achieved during very cold operating conditions by selectively heating a transmitter chip. In particular, the disclosed temperature control system may use one or more consist conditions to determine when to selectively heat the transmitter chip. The operation of the temperature control system will now be explained.

Figure 3:
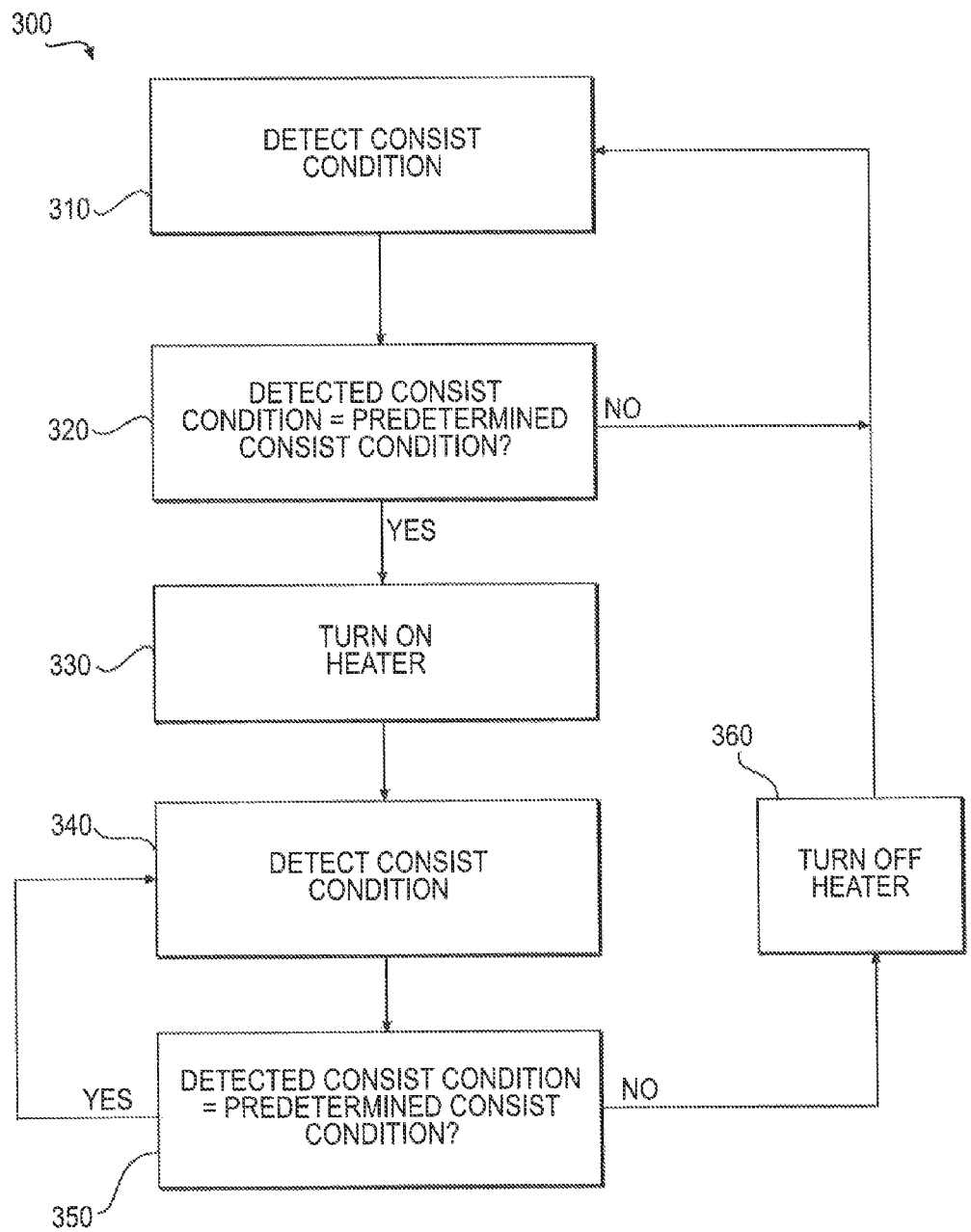
FIG. 3 is a flow chart illustrating an exemplary disclosed method for controlling temperature of the transmitter chip that may be performed by the temperature control system of FIG. 2.

FIG. 3 is a flowchart illustrating an exemplary disclosed method 300 for controlling temperature of transmitter chip 70 that may be performed by temperature control system 60. During the operation of consist 10, controller 76 may perform method 300 to selectively heat transmitter chip 70 via heater 72. Controller 76 may begin method 300 by receiving one or more detected conditions of consist 10 via sensor 74 (step 310). After receiving a detected consist condition, controller 76 may determine whether the detected consist condition matches a predetermined consist condition (step 320).

In one example, the consist condition may be at least one of an ambient temperature, a location of consist 10, and a current time of year. In this example, the detected consist condition may match the predetermined consist condition when the ambient temperature is less than or equal to a threshold temperature. In one embodiment, the threshold temperature may be about −30° to −20° Celsius. This threshold temperature may indicate, for example, a temperature at which a performance of transmitter chip 70 begins to decrease. The detected consist condition may also match the predetermined consist condition when consist 10 is traveling in a particular geographic location. The particular geographic location may be a known area having extremely cold temperatures (e.g., Siberia, Russia). While traveling in these particular geographic locations, transmitter chip 70 may experience very cold temperatures, resulting in decreased performance. The detected consist condition may also match the predetermined consist condition when the current time of year matches predetermined cold month periods (e.g., December-February). These months may be known to have extremely cold temperatures and thus, also affect the performance of transmitter chip 70. In some embodiments, the consist condition may include any of the ambient temperature, the location of consist 10, and the current time of year to determine a performance of transmitter chip 70.

In another example, the consist condition may be a temperature of transmitter chip 70 and/or a detected degradation of transmission of transmitter chip 70. In this example, the detected consist condition may match the predetermined consist condition when a detected temperature of transmitter chip 70 is less than or equal to a threshold temperature (e.g., about 0° to 10° Celsius). This threshold temperature may be a temperature at which a performance of transmitter chip 70 begins to decrease. The detected consist condition may also match the predetermined consist condition when a detected degradation of transmission of data throughput at access point 46 is lower than a threshold data throughput value. For example, the data throughput may be detected at each access point 46 associated with locomotives 12. If the data throughput at any one access point is below a threshold data throughput, then the detected consist condition may be determined to match the predetermined consist condition.

At step 320, if the detected consist condition matches the predetermined consist condition, controller 76 may generate a signal to turn on heater 72 (step 330). However, if the detected consist condition does not match the predetermined consist condition at step 320, method 300 may return to step 310, and controller 76 may continue to detect the consist condition.

Once heater 72 is turned on at step 330, controller 76 may proceed to again detect the consist condition (step 340). After detecting the consist condition at step 340, controller 76 may again determine whether the detected consist condition matches the predetermined consist condition (step 350). In some embodiments, the predetermined consist condition used at step 350 may be substantially the same as the predetermined consist condition used at step 320. If the consist condition matches the predetermined consist condition at step 350, then method 300 may return to step 340, and controller 76 may continue to detect the consist condition. If the detected consist condition at step 350 no longer matches the predetermined consist condition, controller 76 may generate a signal to turn off heater 72 (step 360), and method 300 may return to step 310.

In some embodiments, controller 76 may selectively adjust a heat setting of heater 72 (e.g., increase an amount of heat emitted from heater 72) based on the comparison between the detected consist condition and the predetermined consist condition. For example, if the actual temperature of transmitter chip 70 is below a second threshold temperature, then controller 76 may cause heater 72 to increase an amount of heat emitted to transmitter chip 70, In one embodiment, the second threshold temperature may be about −15° to −5° Celsius, By increasing an amount of heat provided to transmitter chip 70, the disclosed temperature control system may reduce the time period that transmitter chip 70 operates below the first threshold temperature (about 0° to 10° Celsius) and thus, increase performance of consist 10.

Several advantages over the prior art may be associated with the temperature control system. The disclosed temperature control system may allow the use of a high bandwidth transmitter chip that is not rated for extremely cold temperatures. In addition, the disclosed temperature control system may use one or more consist conditions to selectively heat the transmitter chip and increase performance of the transmitter chip. Also, in some applications, the disclosed temperature control system may selectively increase an amount of heat emitted to the high bandwidth transmitter chip based on a consist condition to prevent a decrease in performance of the transmitter chip.

It will be apparent to those skilled in the art that various modifications and variations may be made to the temperature control system. Other embodiments will be apparent to those skilled in the art from consideration of the specification and practice of the disclosed temperature control system. It is intended that the specification and examples be considered as exemplary only, with a true scope being indicated by the following claims and their equivalents.

What is claimed is:

1. A temperature control system for a transmitter chip in a consist, the temperature control system comprising:
    a heater configured to provide heat to the transmitter chip;
    at least one sensor configured to detect a temperature of the transmitter chip and generate a signal indicative of the detected temperature; and
    a controller in communication with the heater and the sensor, the controller configured to:
        receive the signal indicative of the detected temperature;
        compare the detected temperature with at least one predetermined temperature;
        selectively control the heater to provide heat to the transmitter chip based on the comparison, wherein selectively controlling the heater includes:
            turning the heater on when the temperature of the transmitter chip falls below a first threshold temperature, and turning the heater off when the temperature of the transmitter chip rises above the first threshold temperature, and
            selectively increasing an amount of heat emitted from the heater when the temperature of the transmitter chip falls below a second threshold temperature.

2. The temperature control system of claim 1, wherein the at least one sensor is further configured to detect at least one of an ambient temperature, a location of the consist, and a time of year.

3. The temperature control system of claim 2, wherein the controller is configured to turn the heater on when the ambient temperature falls below a threshold ambient temperature, and turn the heater off when the ambient temperature rises above the threshold ambient temperature.

4. The temperature control system of claim 3, wherein the threshold ambient temperature is about −30 to −20 degrees Celsius.

5. The temperature control system of claim 1, wherein the at least one sensor is further configured to detect a transmission degradation of the transmitter chip.

6. The temperature control system of claim 5, wherein the at least one sensor is configured to detect data throughput at an access point of the consist, and the controller is configured to turn the heater on when the detected data throughput falls below a threshold level, and turn the heater off when the detected data throughput rises above the threshold level.

7. The temperature control system of claim 1, wherein the first threshold temperature is about 0 to 10 degrees Celsius.

8. The temperature control system of claim 1, wherein the second threshold temperature is about −10 to −5 degrees Celsius.

9. The temperature control system of claim 1, wherein the transmitter chip is a microprocessor chip configured to perform network communications over an intra-consist electrical cable.

10. The temperature control system of claim 9, wherein the transmitter chip provides a frequency range of between about 2 and 68 MHz.

11. A method of controlling temperature of a transmitter chip in a consist, the method comprising:
    detecting a temperature of the transmitter chip;
    comparing the detected temperature with at least one predetermined temperature; and
    selectively heating the transmitter chip based on the comparison, wherein selectively heating the transmitter chip includes:
        heating the transmitter chip when the detected temperature falls below a first threshold temperature, and not heating the transmitter chip when the detected temperature rises above the first threshold temperature, and
        selectively increasing an amount of heat emitted to the transmitter chip when the temperature of the transmitter chip falls below a second threshold temperature.

12. The method of claim 11, further including sensing an ambient temperature, wherein selectively heating the transmitter chip includes heating the transmitter chip when the sensed ambient temperature falls below a threshold temperature, and not heating the transmitter chip when the sensed ambient temperature rises above the threshold temperature.

13. The method of claim 11, further including detecting data throughput at an access point associated with the consist, wherein selectively heating the transmitter chip includes heating the transmitter chip when the detected data throughput falls below a threshold level of data throughput, and not heating the transmitter chip when the detected data throughput rises above the threshold level of data throughput.

* * * * *